C. W. CAHOON.
Broadcast-Seeder.
No. 18,083.  Patented Sept 1, 1857.
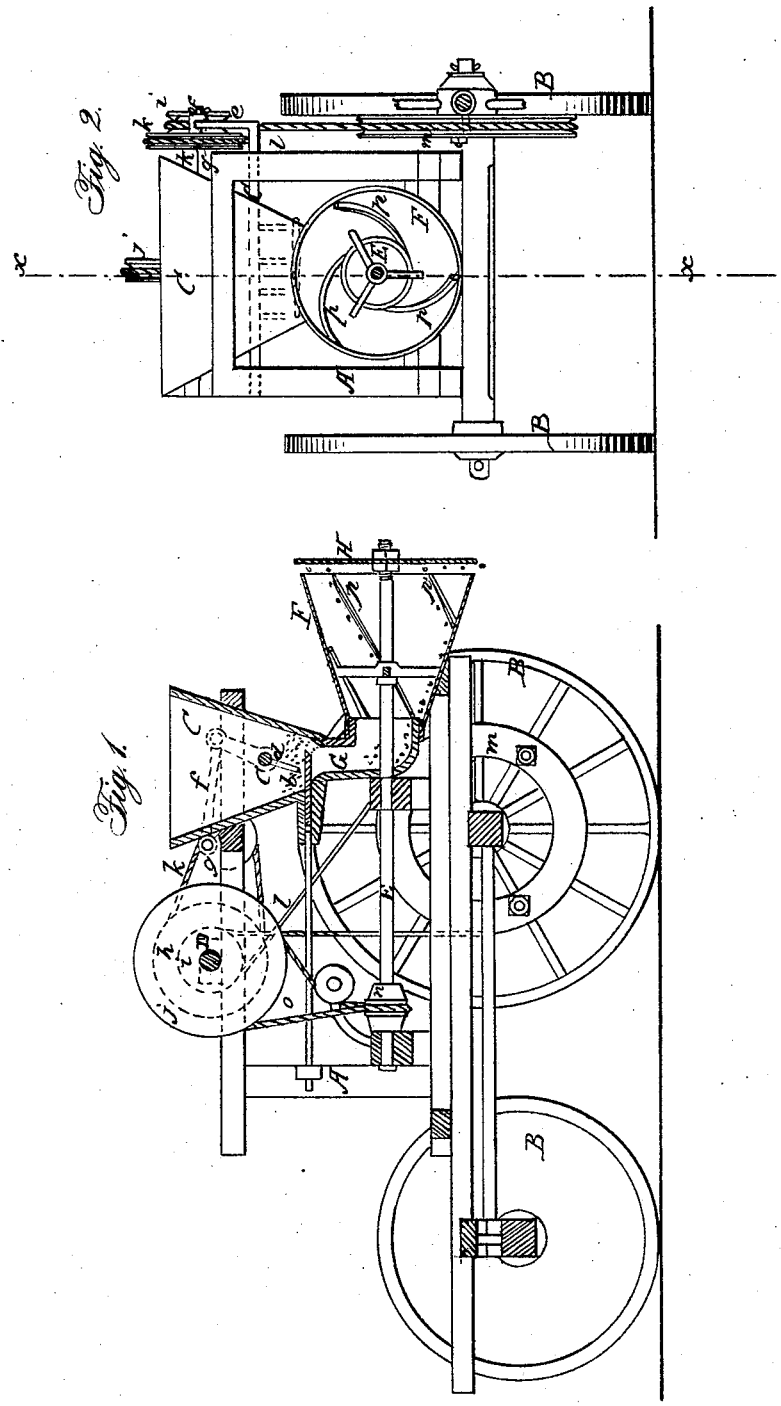

UNITED STATES PATENT OFFICE.

CHARLES W. CAHOON, OF BROOKLYN, NEW YORK.

IMPROVEMENT IN SEEDING-MACHINES.

Specification forming part of Letters Patent No. 18,083, dated September 1, 1857.

*To all whom it may concern:*

Be it known that I, CHARLES W. CAHOON, of Brooklyn, in the county of Kings and State of New York, have invented a new and Improved Machine for Sowing Seed and Fertilizing Materials Broadcast; and I do hereby declare that the following is a full, clear, and exact description of the same, reference being had to the annexed drawings, making a part of this specification, in which—

Figure 1 is a longitudinal vertical section of my improvement, $x\ x$, Fig. 2, indicating the plane of section. Fig. 2 is a back view of same.

Similar letters of reference indicate corresponding parts in the two figures.

This invention consists in the novel means employed for discharging broadcast the seed or fertilizing material, whereby the work is done in a perfect manner. This object is attained by employing a rotating funnel-shaped discharger, which is placed horizontally below the hopper, the hopper connecting with the discharger and arranged as will be hereinafter fully described.

To enable those skilled in the art to fully understand and construct my invention, I will proceed to describe it.

A represents a framing, which may be of rectangular form and constructed in any proper manner to support the working parts.

The framing A may be mounted on wheels B, or it may be placed within the body of an ordinary vehicle and have motion communicated to it from one end of the wheels of the vehicle. I prefer, however, to have the framing mounted on wheels, as shown in the drawings.

On the upper part of the framing A a seed-hopper, C, is placed. This hopper is of the usual form, and has a slide, $b$, at its bottom, as shown in Fig. 1.

Within the hopper C a rock-shaft, $c$, is placed longitudinally, and this shaft has a series of teeth, $d$, attached to it. The shaft is operated by having a crank, $e$, at one end, to which crank a connecting-rod, $f$, is attached, the connecting-rod being secured to a crank-pulley, $g$, attached to one side of the framing A.

D is a shaft, which is placed transversely on the upper part of the framing A. On one end of this shaft two pulleys, $h\ i$, are attached, and a pulley, $j$, is placed on the shaft at about its center. The crank-pulley $g$ is driven by a belt, $k$, from the pulley $h$ on the shaft D, and the shaft D is driven by a belt, $l$, from a pulley, $m$, attached to the inner side of one of the wheels B.

E represents a shaft, which is placed longitudinally in the framing A.

On the outer part of the shaft E a funnel-shaped chamber, F, is secured. This chamber, which I term a "discharger," may be constructed of sheet metal, and its back end, which has the smaller diameter, communicates with a bent tube, G, which is attached to the lower end of the hopper, as shown clearly in Fig. 1.

On the inner end of the shaft E a pulley, $n$, is placed, and a belt, $o$, passes around this pulley, and also around a pulley, $j$, on the shaft D.

To the inner surface of the discharger F spiral flanges $p$ are attached. Three are shown in the drawings; but more or less may be used, as occasion may require, and to the outer end of the shaft E a circular disk, H, is attached. This disk H is secured on the shaft a short distance from the mouth or outer end of the discharger F, and is a trifle larger in diameter than the mouth or outer end of the discharger. The flanges $p$ may be of greater or less width, as desired.

The operation is as follows: The seed or other material is placed within the hopper C, and the slide $b$ is drawn out to a certain distance, so as to allow the seed to pass down into the discharger F, the slide $b$ regulating the flow of the seed into the discharger. As the machine is drawn along the vibrating teeth $d$ agitate the seed within the hopper and prevent it from clogging or choking. A rotary motion is given the discharger F by the belt $o$ from the shaft D, and the seed is thrown broadcast from the outer end of the discharger F by the revolutions of the same. The spiral flanges $p$ create a current of air within the discharger which gives an impetus to the seed, and they also serve to drive it directly out as the seed is kept against the sides of the discharger by centrifugal force. The disk H prevents the air from rushing into the mouth of the discharger and thereby intercepting the proper discharge of the seed, and also serving as a guide to insure its issuing from the mouth of the discharger at its edge or periphery.

I would remark that in certain cases the flanges *p* and disk H may be dispensed with. The use for these parts depends considerably on the dimensions of the discharger and the rapidity of its rotation.

This invention is extremely simple, and the seed or fertilizing material will be discharged in a very even manner—in fact the distribution may be nicely graduated. It possesses great advantages over shaking or reciprocating screens and similar devices which have been employed for effecting the desired result, and is also superior to the horizontal rotating wheels which distribute or throw the seed all around in front as well as in the rear of the machine, and in those cases where the seed is prevented from being thrown in front of the implement the centrifugal force is in a measure destroyed.

I do not claim the slide *b*, nor the rock-shaft *c*, with teeth *d* attached, for stirring or agitating the seed within the hopper; neither do I claim distributing or sowing seed broadcast by means of centrifugal force effected by the rotation of wheels or cylinders irrespective of the construction and arrangement herein shown; but

Having thus described my invention, what I claim as new, and desire to secure by Letters Patent, is—

The disk H and rock-shaft *c*, with its teeth *d*, in combination with the funnel-shaped discharger F, having spiral flanges *p* arranged substantially as and for the purposes set forth.

CHARLES W. CAHOON.

Witnesses:
ROBT. ILSLEY,
HENRY A. FURBISH.